May 24, 1932.  I. S. KELLEY  1,859,925
TOILET DEVICE FOR VEHICLES
Filed July 17, 1930
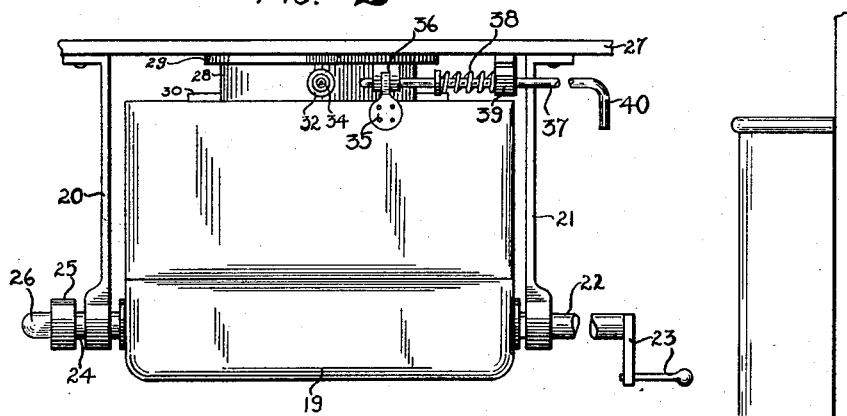
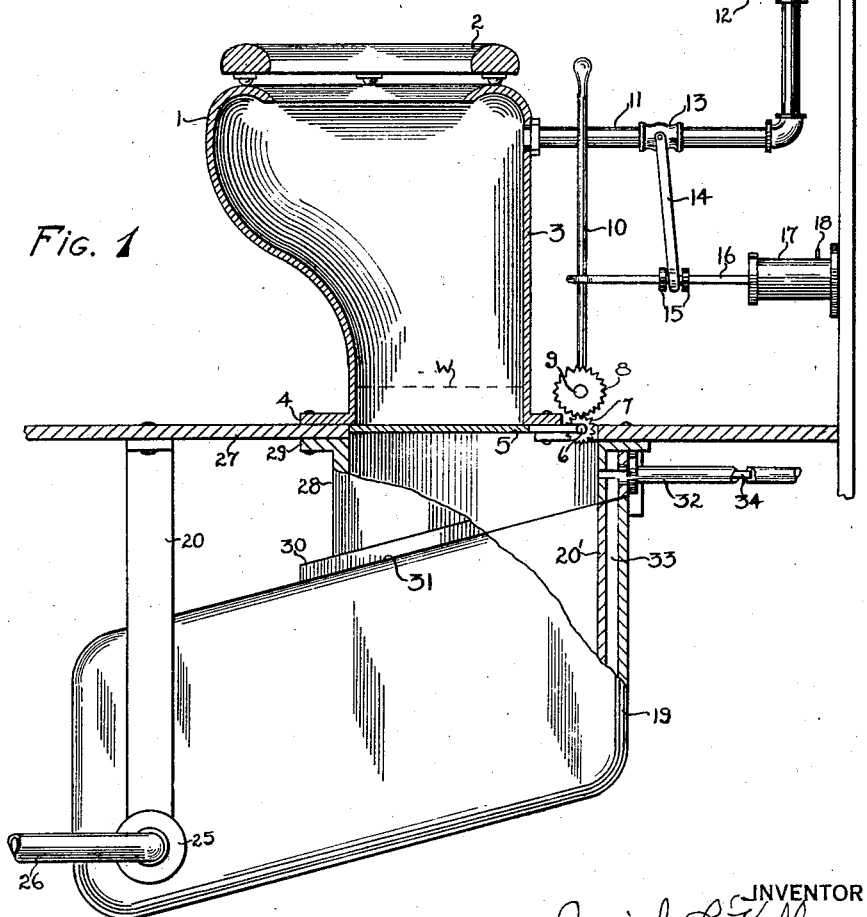

Patented May 24, 1932

1,859,925

UNITED STATES PATENT OFFICE

ISAIAH S. KELLEY, OF NEW YORK, N. Y.

TOILET DEVICE FOR VEHICLES

Application filed July 17, 1930. Serial No. 468,553.

The device, the subject of this invention, has for its object, the provision of a toilet adapted to be employed upon vehicles such as automobiles, buses, aeroplanes, Pullman cars, and all other vehicles wherein it is desired to provide toilet facilities, and yet wherein it is exceedingly desirable that the waste from the toilet be not deposited upon the road-way, but be retained until the time and place has arrived for the discharge of same.

A special object of this invention is to provide a toilet having a water seal of simple construction, that may be readily operated.

Another object of the invention is to provide a receptacle that may be operated from the exterior of the vehicle, and another object of the invention is to provide means for keeping the receptacle warm, though not necessarily hot, to prevent freezing of the liquid contained therein, and to make the discharge quite easy, even in the coldest weather.

With the above objects in view, the following is what I consider the best means of carrying out my invention, and the accompanying drawings should be referred to for a complete understanding of the specification which follows.

In the drawings:—

Fig. 1 is a side elevation partly in section of my complete device, and

Fig. 2 is a front elevation of the container.

Similar reference numerals indicate like parts in all the figures where they appear.

At 1, in Fig. 1, I show a toilet bowl having a seat 2 arranged thereon. This bowl may be of quite ordinary construction, but I prefer for cleanliness, that the back portion thereof, or the bowl indicated at 3, be vertical, and not bulged inward or outward, as is common with bowls.

A flange 4 is provided for securing the bowl, and operably arranged below, but in sealed relation with the flange 4, is a valve member 5, mounted upon a shaft 6, and upon this shaft, is a pinion 7, rotated by means of a gear 8. The gear in turn, is mounted upon the shaft 9, which also receives the operating lever 10.

At 11, I show a water inlet, and at 12, a water supply tank. The valve 13 in the water inlet pipe 11, is operated by means of a lever 14, which is a forked lever, and which is received between the collars 15 on the rod 16.

This rod 16 engages the operating lever 10, and is really a piston rod attached to a piston which operates in a cylinder 17. The cylinder 17 is provided with a spring not shown, and an air valve 18. The construction of such air checks is common. The spring urging the rod 16 inward against a controlled discharge of air through the air valve 18, will close the valve, or sealing plate 5, and will also shut off the water valve 13, but I so time my device that the water valve is closed after the sealing disk or valve 5, as I desire to retain a water seal on top of the member 5, as indicated by the dotted line 11.

The discharge from the bowl 1, is received in a receptacle, which I will indicate as a whole by the reference character 19. This receptacle is rotatably supported between the brackets 20 and 21, the support 22 being merely a tubular air shaft support operable by means of the crank and handle 23. The support 24 is tubular, and by means of an ordinary slip connection 25, is connected to a pipe 26, which pipe may be an extension from the exhaust pipe from the motors of the vehicle.

It will be noted that the vehicle 19 is provided with an inner wall 20', and this wall may be a porcelain receptacle arranged within the casing 19, or it may be a porcelain cover, formed integral with the casing 19.

Under the portion which I term the floor 27, I arrange a depending member 28, in which member the sealing disk 5 operates. This depending member 28 is provided with a flange 29, by which it may be secured to the floor member 27, and a second flange 30 formed integral with the member 28, serves as a sealing means between the member 28, and the rotatable receptacle 19, and it will be noted that the line of junction between the flange 30 and the receptacle 19 is an angular line, as shown as 31.

This angular line is made necessary by the fact that the chamber 19 rotates on the pivotal point formed by the supports 22 and 24.

It will be noted that at least one side of the member 28 is formed with a double wall. Secured to the outer wall of the member 28, and at the point where the double wall is to be found, is a duplex exhaust pipe.

The larger exhaust pipe 32 connecting with the space 33 between the inner and outer walls of the member 19, and the inner or smaller exhaust pipe 34 extending through the inner wall of the member 28, is therefore open to the receptacle 19. The pipe 34 is of a length less than the exhaust pipe 32, so that the exhaust through the pipe 32 will act as a suction means on the pipe 34. This pipe will carry away excessive odors, and it is therefore desirable that it project considerably behind the vehicle.

I have previously stated that the receptacle 19 is rotated by means of the handle 23. I provide a latch which consists of an eye plate 35, secured to the member 19, and a block 36 secured to the flange 29, also provided with eyes or perforations.

A rod 37, urged inward by a spring 38, and supported in a block 39, secured to the floor 27, enters through the perforations in the block 36, and the perforation in the eye block 35, and I provide a handle 40 for withdrawing this locking bar 37.

When the locking bar is withdrawn, the receptacle 19 can swing downward to discharge its content into the pit, or at any other desirable place, and when downwardly depending, may be flushed by the use of the hand hose. When cleansed, the receptacle 19 is rotated and backed into position by means of the handle 23, and thereupon the pin 37 is inserted in the position shown in Fig. 2, and the device is retained in operation.

It will of course be understood that the general shape of the receptacle 19 may be changed; that a somewhat different flushing means may be employed, and other modifications made within the scope of the appended claims without departing from the principle or sacrificing the advantages of this invention.

Having carefully and fully described my invention, what I claim and desire to secure by Letters Patent is:—

1. A toilet device for vehicles comprising a bowl, and means for flushing it, a closure for the outlet of said bowl, a depending cylindrical member supporting said closure and one part of which is provided with a double wall, and an angularly disposed receptacle adapted to be brought into close contact with said depending member, and certain parts of which are provided with a double wall in line with the double wall of the cylindrical member, and means for passing a heating medium between said walls of said receptacle and through the double wall portion of said depending member.

2. A toilet device for vehicles, comprising a bowl, a cylindrical depending member and an oblong receptacle in contact with one end thereof, both the depending member and the receptacle having their adjacent faces cut at an angle and normally secured closely adjacent, means for rotating said receptacle from said depending member, and a pipe connection passing through said depending member and in communication with said receptacle.

ISAIAH S. KELLEY.